US012280586B2

(12) United States Patent
Sakaue

(10) Patent No.: US 12,280,586 B2
(45) Date of Patent: Apr. 22, 2025

(54) GRAVURE PLATE FOR WIRING PRINTING

(71) Applicant: JAPAN AVIATION ELECTRONICS INDUSTRY, LIMITED, Tokyo (JP)

(72) Inventor: Akitoshi Sakaue, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 176 days.

(21) Appl. No.: 18/121,207

(22) Filed: Mar. 14, 2023

(65) Prior Publication Data

US 2023/0302782 A1 Sep. 28, 2023

(30) Foreign Application Priority Data

Mar. 22, 2022 (JP) ................................ 2022-045060

(51) Int. Cl.
*B41F 13/11* (2006.01)
*B41F 21/08* (2006.01)
*B41F 27/12* (2006.01)

(52) U.S. Cl.
CPC .............. *B41F 13/11* (2013.01); *B41F 21/08* (2013.01); *B41F 27/1281* (2013.01)

(58) Field of Classification Search
None
See application file for complete search history.

(56) References Cited

U.S. PATENT DOCUMENTS

| 11,310,909 B2 | 4/2022 | Kogawa et al. |
| 11,582,868 B2 | 2/2023 | Kogawa et al. |
| 2017/0156206 A1 | 6/2017 | Kogawa et al. |
| 2019/0160842 A1 | 5/2019 | Ueda |

FOREIGN PATENT DOCUMENTS

| JP | 2016-58664 | 4/2016 | |
| JP | 2017-159478 A | 9/2017 | |
| TW | 201408152 | 2/2014 | |
| TW | 201806785 | 3/2018 | |
| WO | WO-2018034031 A1 * | 2/2018 | .............. B41F 17/14 |

OTHER PUBLICATIONS

Translation of WO2018034031A1.*
Office Action issued in Corresponding Taiwanese Patent Application No. 112109160, dated Nov. 7, 2023, along with an English translation thereof.

* cited by examiner

*Primary Examiner* — Joshua D Zimmerman
(74) *Attorney, Agent, or Firm* — IGreenblum & Bernstein, P.L.C.

(57) ABSTRACT

In a gravure plate for wiring printing on which a recessed portion defining a wiring pattern is formed on a plate surface, a projecting portion for reducing a volume of the recessed portion is formed on a bottom surface of the recessed portion. A contour of the projecting portion in cross section parallel to the plate surface has a semicircular arc shape, which protrudes toward one side in one direction that is parallel to the plate surface, on the one side. The recessed portion has a side wall that is composed of a plane orthogonal to the plate surface and faces the projecting portion at a distance of 15 μm or less without coming into contact with the projecting portion. The contour of the projecting portion has a semicircular arc shape, which protrudes toward the side wall, also on a side closer to the side wall.

1 Claim, 13 Drawing Sheets

FIG. 8A
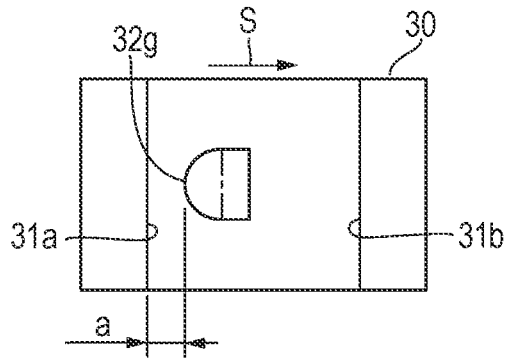
FIG. 8B
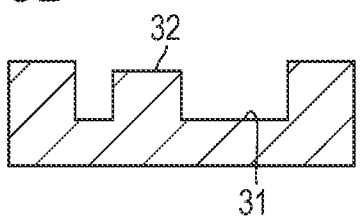
FIG. 8C
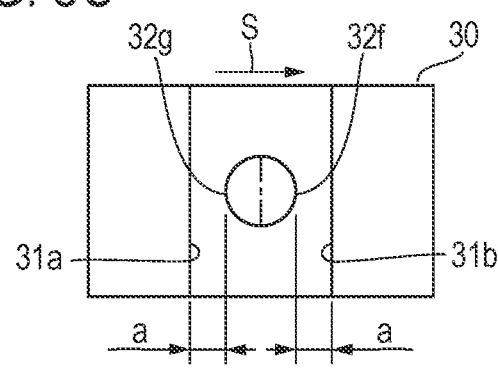
FIG. 8D
FIG. 8E
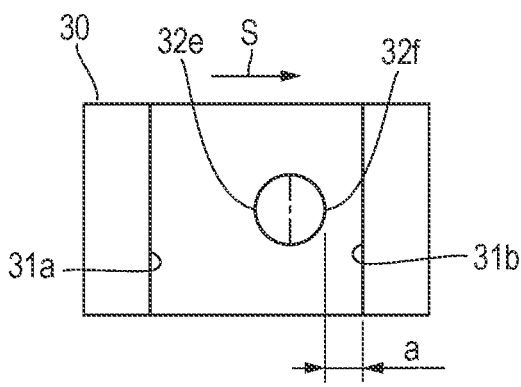
FIG. 8F
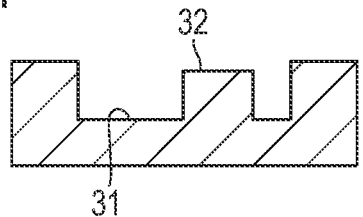

GRAVURE PLATE FOR WIRING PRINTING

TECHNICAL FIELD

The present invention relates to a gravure plate for wiring printing.

BACKGROUND ART

In printing and forming a wiring pattern with conductive ink using a gravure plate, application of an excessive amount of conductive ink causes generation of a printing failure such as bleeding of the wiring pattern and crossed lines.

As a method for preventing generation of such a printing failure, it can be considered to reduce and adjust an amount of conductive ink filled into a recessed portion which is formed on a plate surface of a gravure plate for defining a wiring pattern. Japanese Patent Application Laid Open No. 2017-159478 (hereinafter, referred to as Patent Literature 1) provides the description in which a projecting portion for reducing a volume of a recessed portion is formed on a bottom surface of the recessed portion, defining a wiring pattern, of a gravure plate and the amount of conductive ink is reduced by the volume of the projecting portion.

FIGS. 1A and 1B illustrate a configuration of a portion of the gravure plate described in Patent Literature 1, in which projecting portions 12 are formed on a bottom surface of a recessed portion 11, used for defining a wiring pattern, of a gravure plate 10 so as to be arrayed at a predetermined pitch in a longitudinal direction of the recessed portion 11, that is, in a longitudinal direction of the wiring pattern. The projecting portion 12 has a top surface 12a of a square shape and the top surface 12a is positioned on the same plane as an upper surface 10a of the gravure plate 10.

FIG. 1C illustrates a cross section of a wiring pattern 16 printed and formed on a base material 15, corresponding to FIG. 1B.

Patent Literature 1 further describes gravure offset printing of a capacitive touch panel by using a gravure plate including the configuration described above. FIG. 2 illustrates a configuration overview of the touch panel described in Patent Literature 1.

The touch panel is configured in a manner in which a first conductive layer, an insulating layer, a second conductive layer, and a protecting film are laminated and formed in sequence on a transparent substrate. In FIG. 2, 21 denotes a transparent substrate, and 22 denotes a sensor region in which a sensor electrode row is located, although detailed illustration is omitted. Further, 23 and 24 denote lead-out wirings which are led out from the sensor electrode row, and 25 denotes a terminal portion. Only lead-out wirings 23 and 24 which are located on both ends of the row are illustrated and the illustration of the lead-out wirings other than those located on the both ends is omitted.

In Patent Literature 1, projecting portions are formed in a recessed portion, defining the lead-out wirings 23 and 24, of the gravure plate, in the touch panel illustrated in FIG. 2, in a similar manner to the recessed portion 11 illustrated in FIGS. 1A and 1B.

The filling amount of conductive ink can be reduced and adjusted by forming a projecting portion in a recessed portion, defining a wiring pattern, of a gravure plate, as described above. However, in the configuration in which the projecting portion 12 has a rectangular parallelepiped shape and has the square-shaped top surface 12a as illustrated in FIG. 1A, a cutting edge of a doctor blade often collides with the sharp corner of the projecting portion 12 and the cutting edge is chipped in squeegeeing for filling of conductive ink.

First, such chipping of the cutting edge of the doctor blade causes an occurrence of a scraping failure in subsequent squeegeeing and also causes formation of unwanted strokes in forms of streaks in a printed material after transfer.

Second, fragments of the chipped doctor blade are caught in a gap between a side wall of the recessed portion and the projecting portion, thus being another cause of a printing failure. Specifically, in a configuration in which a projecting portion forms a gap having uniform width as shown in the gaps between the side wall of the recessed portion 11 and the projecting portions 12 illustrated in FIG. 1A, a fragment caught in the gap does not easily come out but easily remain in the recessed portion as a foreign body.

Such remaining of a foreign body in the recessed portion causes a filling failure of conductive ink and causes a defect in a printed wiring pattern.

BRIEF SUMMARY OF THE INVENTION

An object of the present invention is to provide a gravure plate for wiring printing that employs in a recessed portion a projecting portion to reduce and adjust a filling amount of conductive ink but can suppress above-described chipping of a cutting edge of a doctor blade and remaining of fragments as a foreign body and thereby suppress occurrences of various printing failures caused by the chipping and remaining.

According to a first aspect of the present invention, in a gravure plate for wiring printing having a plate surface on which a recessed portion defining a wiring pattern is formed, a projecting portion for reducing a volume of the recessed portion is formed on a bottom surface of the recessed portion. A contour of the projecting portion in cross section parallel to the plate surface has a first side and a first semicircular arc shape on the first side, wherein the first side is facing in one direction that is parallel to the plate surface and the first semicircular arc shape protrudes in the one direction. The recessed portion has a side wall that forms a plane orthogonal to the plate surface and opposes the projecting portion at a distance of 15 μm or less without coming into contact with the projecting portion. The contour of the projecting portion has a second side and a second semicircular arc shape on the second side, wherein the second side is facing the side wall and the second semicircular arc shape protrudes toward the side wall. In this case, the first side and the second side of the contour may possibly overlap partially or entirely.

According to a second aspect of the present invention, in a gravure plate for wiring printing on which a recessed portion defining a wiring pattern is formed on a plate surface, a projecting portion for reducing a volume of the recessed portion is formed on a bottom surface of the recessed portion in a state in which a side wall of the recessed portion is in surface contact with a side surface of the projecting portion. A contour of the projecting portion in cross section parallel to the plate surface outside the side surface in surface contact with the side wall has a first side and a first semicircular arc shape on the first side, wherein the first side is facing in one direction that is parallel to the plate surface and the first semicircular arc shape protrudes in the one direction.

Effects of the Invention

The present invention can suppress chipping of a cutting edge of a doctor blade in squeegeeing and can suppress remaining of fragments of the chipped doctor blade in a gap between a side wall of a recessed portion and a projecting portion which is located in the recessed portion, accordingly being able to suppress occurrences of various printing failures caused by the chipping of the cutting edge of the doctor blade and the remaining of a foreign body in the recessed portion.

In addition, the present invention can also suppress an occurrence of a printing failure caused by a foreign body other than fragments of a chipped doctor blade, which comes to be caught and remain in the gap between the side wall of the recessed portion and the projecting portion.

BRIEF DESCRIPTION OF THE DRAWINGS

FIG. 8A is a plan view illustrating an example of a recessed portion and a projecting portion.

FIG. 8B is a sectional view of the example illustrated in FIG. 8A.

FIG. 8C is a plan view illustrating another example of a recessed portion and a projecting portion.

FIG. 8D is a sectional view of the example illustrated in FIG. 8C.

FIG. 8E is a plan view illustrating still another example of a recessed portion and a projecting portion.

FIG. 8F is a sectional view of the example illustrated in FIG. 8E.

LIST OF REFERENCE NUMERALS

Figure 1A:
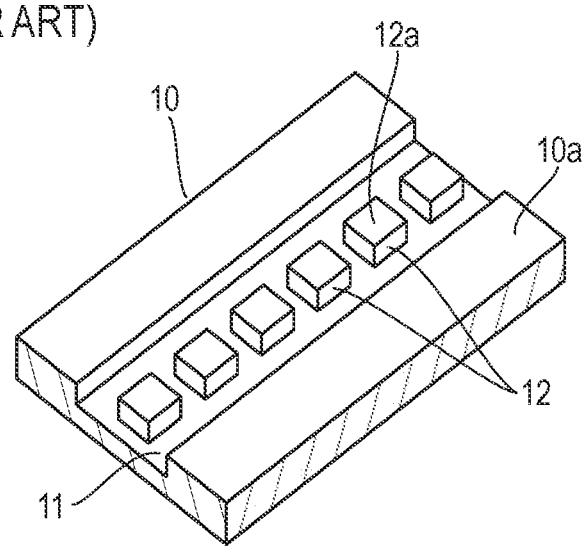
FIG. 1A is a perspective view illustrating a configuration of a main portion of a conventional gravure plate for wiring printing.
Figure 1B:
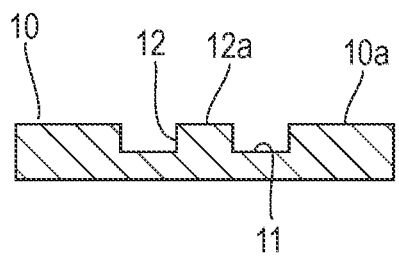
FIG. 1B is a sectional view of FIG. 1A.
Figure 1C:
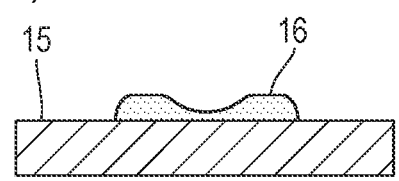
FIG. 1C is a sectional view illustrating a wiring pattern which is printed and formed on a base material, corresponding to FIG. 1B.

10: gravure plate
10a: upper surface
11: recessed portion
12: projecting portion
12a: top surface
15: base material
16: wiring pattern
21: transparent substrate 22: sensor region
23: lead-out wiring
24: lead-out wiring
25: terminal portion
30: gravure plate
30a: plate surface
31: recessed portion
31a: side wall
31b: side wall
32: projecting portion
32a: semicircular arc-shaped contour
32b: U-shaped contour
32c: semicircular arc-shaped contour
32d: side surface
32e: semicircular arc-shaped contour
32f: semicircular arc-shaped contour
32g: semicircular arc-shaped contour

DETAILED DESCRIPTION

Figure 2:
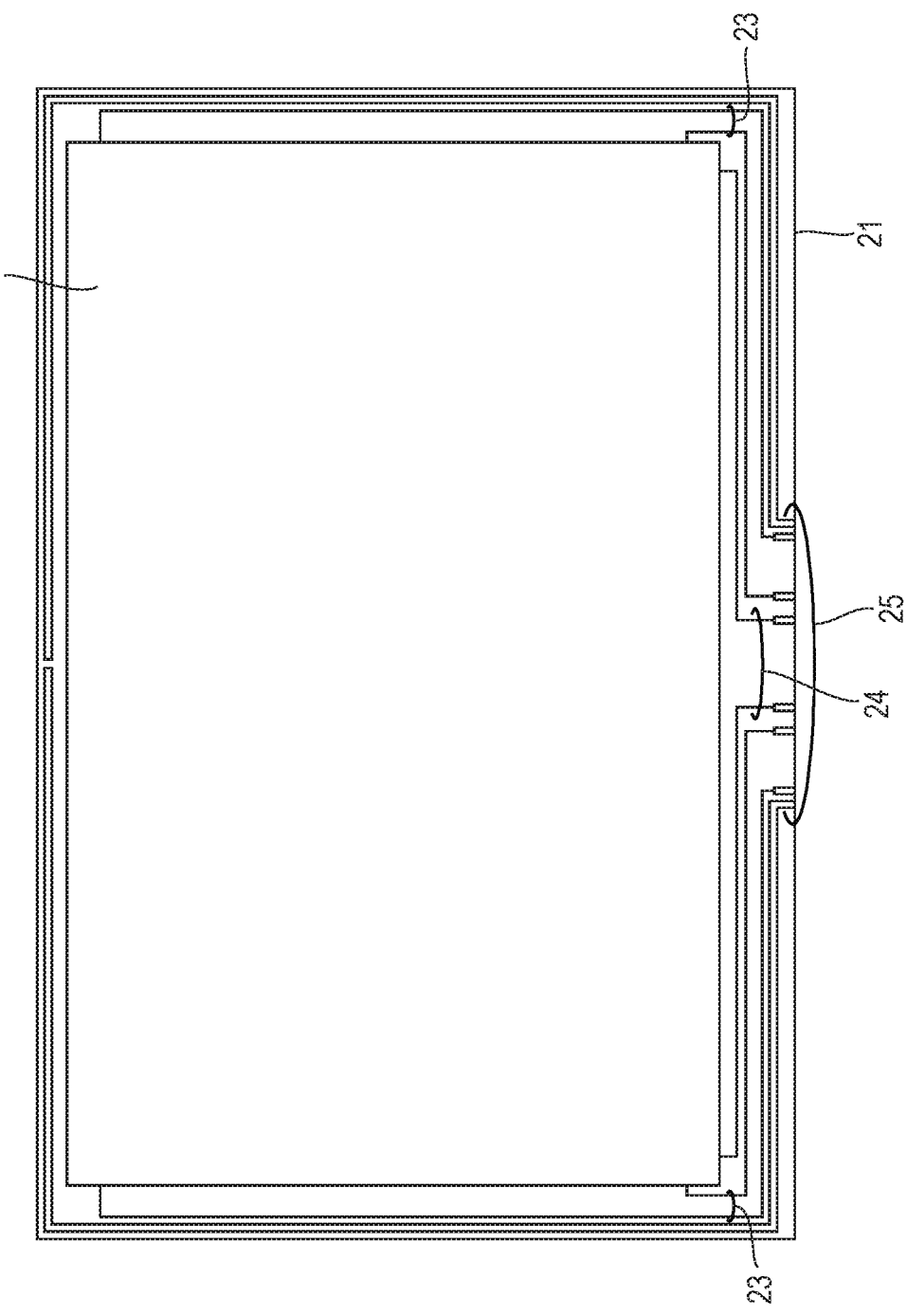
FIG. 2 is a plan view illustrating a configuration overview of a touch panel which is printed and formed by using a gravure plate.

Embodiments of the present invention will be described based on examples with reference to the accompanying drawings. The gravure plate for wiring printing according to the present invention is to be used, for example, for the above-mentioned gravure offset printing of a touch panel as that illustrated in FIG. 2. Only the configuration of a main portion of a gravure plate according to the present invention will be illustrated and described below.

First Embodiment

Figure 3C:
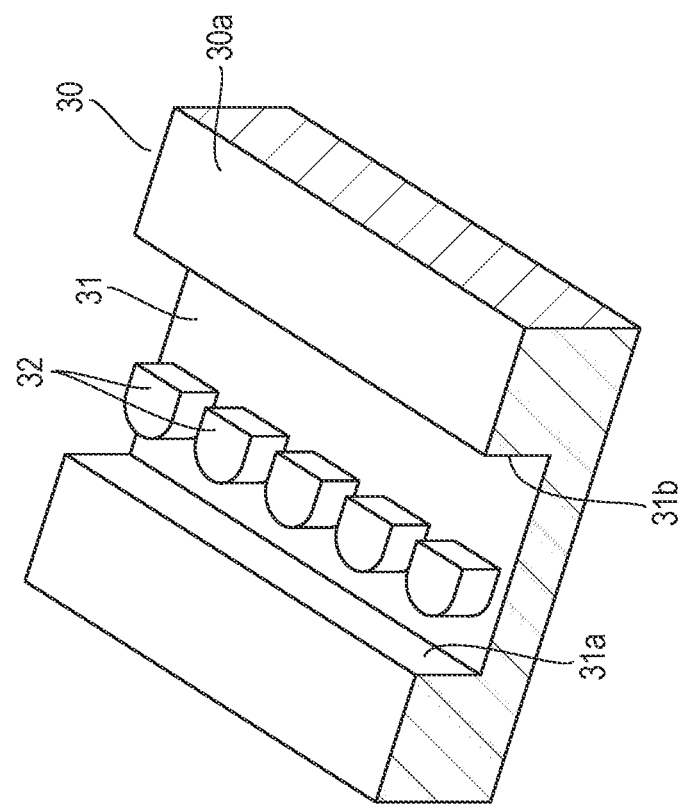
FIG. 3C is a perspective view illustrating the configuration of the main portion of the gravure plate for wiring printing according to the first embodiment of the present invention.
Figure 3A:
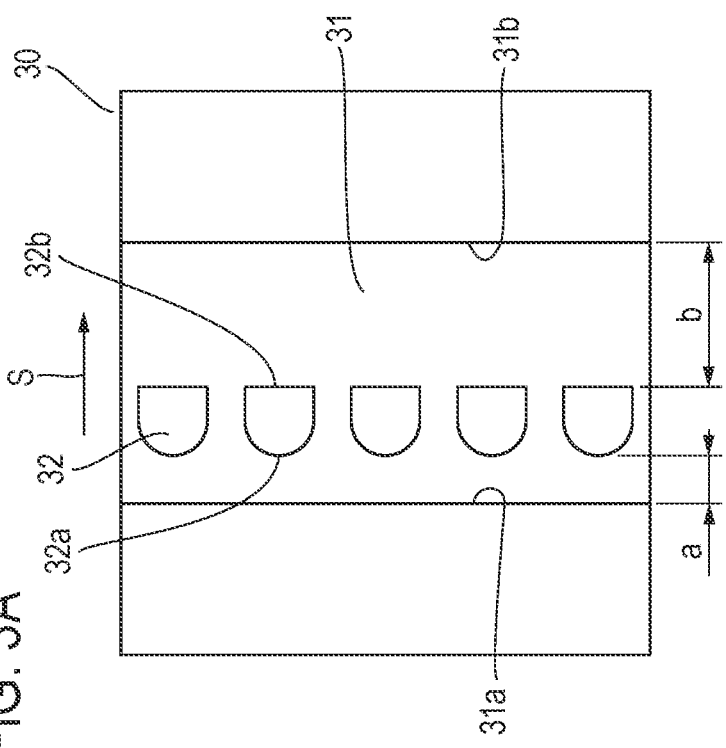
FIG. 3A is a plan view illustrating a configuration of a main portion of a gravure plate for wiring printing according to a first embodiment of the present invention.
Figure 3B:
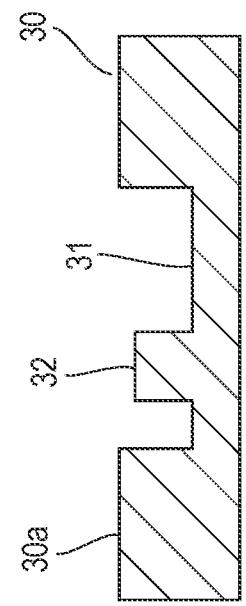
FIG. 3B is a sectional view illustrating the configuration of the main portion of the gravure plate for wiring printing according to the first embodiment of the present invention.

FIGS. 3A, 3B, and 3C illustrate a configuration of a main portion of a gravure plate according to a first embodiment of the present invention. On a bottom surface of a recessed portion 31 which is formed on a plate surface 30a of a gravure plate 30 and defines a wiring pattern, projecting portions 32 reducing a volume of the recessed portion 31 are formed to be aligned in a row in an extending direction of the recessed portion 31. An arrow S in FIG. 3A denotes a squeegeeing direction of a doctor blade with respect to the gravure plate 30, and the squeegeeing direction in this example is orthogonal to the extending direction of the recessed portion 31.

The recessed portion 31 has a uniform width in this example and both side walls 31a and 31b of the recessed portion 31 are planes orthogonal to the plate surface 30a. In this example, these side walls 31a and 31b oppose the projecting portion 32 without coming into contact with the projecting portions 32. Here, the term "oppose" denotes that the projecting portion is at least partially located in a region that extends in a front direction of the side wall within the recessed portion, wherein the front direction is perpendicular to the side wall that forms a plane. In this example, specifically, the projecting portions 32 are located in both the regions that each extend in front of both of the side walls 31a and 31b that each form planes. Although FIGS. 3A, 3B, and 3C do not illustrate endpoints of the side walls 31a and 31b on both ends in the extending direction of the recessed portion 31, a side wall, generally, draws a line segment, or a segment of a straight line, limited by two ends when viewed from vertically above the plate surface. Therefore, the term "oppose" in the present invention denotes in other words that at least a portion of a contour of the projecting portion is positioned in a limited area that extends in a front direction of the line segment, wherein the front direction is perpendicular to the line segment, when viewed from vertically above the plate surface. When a distance between the side wall 31a and the projecting portion 32 is defined as a and a distance between the side wall 31b and the projecting portion 32 is defined as b as illustrated in FIG. 3A, the distance a and the distance b satisfy a 15 μm and b>15 μm. A contour of the projecting portion 32 in cross section which is parallel to the plate surface 30a comprises a semicircular arc-shaped contour 32a as a second semicircular arc shape, which protrudes toward the side wall 31a, on a side of it, or on a second side of it, facing the side wall 31a that opposes the projecting portion 32 at the distance a. On the other hand, on another side facing the side wall 31b, the contour of the projecting portion 32 in cross section which is parallel to the plate surface 30a comprises a flat contour 32b. That is, the projecting portion 32 has a shape obtained by combining a semicircular column with a quadrangular prism, and the height of the projecting portion 32 is set to be slightly lower than the plate surface 30a of the gravure plate 30, in this example.

The projecting portion 32 has the above-described shape in this example. In terms of the relationship with the squeegeeing direction of the doctor blade shown with the arrow S, the semicircular arc-shaped contour 32a, also as a first semicircular arc shape, of the projecting portion 32 protrudes upstream, as in one direction, on the upstream side, or on a first side facing in the one direction that overlaps the second side entirely, in the squeegeeing direction.

The projecting portion 32 has the semicircular arc-shaped contour 32a on the upstream side in the squeegeeing direction as mentioned above, and thus a part of the projecting portion 32 with which a cutting edge of a doctor blade collides in squeegeeing by the doctor blade has no corners but has a rounded shape, unlike the conventional example. This configuration can favorably suppress chipping of a cutting edge of a doctor blade which has been conventionally occurred due to collision of the cutting edge of the doctor blade with a sharp corner of a projecting portion.

In addition, the present invention including this example can suppress remaining of fragments of a chipped doctor blade and other foreign bodies which are caught in a recessed portion. General description will be provided below on this point.

In the configuration in which a projecting portion is provided in a recessed portion, a foreign body is often caught in a gap between a side wall of the recessed portion and the projecting portion and the foreign body often remains in the recessed portion. Examples of a foreign body that can be generated in squeegeeing itself include:

(1) fine particles of a blade material, for example, stainless, which are generated due to abrasion of a doctor blade, (2) fragments, or chips, of a doctor blade caused by chipping of a cutting edge of the doctor blade (or nick in the blade), and (3) clumps of fallen conductive particles, for example, silver particles, that are formed in conductive ink which adheres and accumulates on a cutting edge of a doctor blade through repeated squeegeeing. However, the size of fine particles in (1) is substantially the same or smaller than the size of conductive particles contained in conductive ink and accordingly the fine particles do not cause problems even when the fine particles are directly mixed in a printed wiring pattern.

On the other hand, fragments of a doctor blade in (2) and clumps of conductive particles in (3) may be caught in a gap and remain in the recessed portion as foreign bodies.

Speaking of fragments caused by chipping of a cutting edge of a doctor blade in (2), almost all the fragments do not have the size greater than 15 µm and generally have the size of 15 µm or less. The above is the general description on a foreign body generated in squeegeeing.

FIGS. 3A, 3B, and 3C illustrate the configuration with special consideration for the size of fragments of the doctor blade as foreign bodies.

That is, as illustrated in FIGS. 3A, 3B, and 3C, when there is the side wall 31a that forms a plane and opposes the projecting portion 32 at a distance of 15 µm or less, a side surface of the projecting portion 32 facing the side wall 31a is largely rounded to obtain the semicircular arc-shaped contour 32a in cross section. Accordingly, a gap between the side wall 31a being a plane and the projecting portion 32 does not have a uniform width. The gap largely expands on both directions, that is, on directions of both sides in the extending direction of the plane of the side wall 31a when viewed from vertically above the plate surface 30a. Therefore, fragments of the doctor blade are not easily caught in the gap, and even if fragments are caught, the fragments easily come out, thus being able to suppress an occurrence of a state in which fragments of the doctor blade are caught and remain in the recessed portion 31.

Meanwhile, there are few foreign bodies greater than 15 µm, no matter whether they are fragments of the doctor blade, substances coming from outside, or bodies not generated in squeegeeing. Therefore, it can be said that there are few situations in which a foreign body is caught between the projecting portion 32 and the side wall 31b that face at a distance greater than 15 µm, illustrated in FIGS. 3A, 3B, and 3C. This eliminates a necessity of rounding a side surface of the projecting portion 32 facing the side wall 31b unlikely the side surface facing the side wall 31a, and any shape can be employed as the side surface facing the side wall 31b. In this example, the side surface of the projecting portion 32 facing the side wall 31b has the flat contour 32b in cross section, as illustrated in FIGS. 3A, 3B, and 3C.

In order to also avoid remaining of a caught clump of conductive particles in the recessed portion in (3), it is preferable to set a lower limit of a distance between the projecting portion and the side wall of the recessed portion, which forms a plane and opposes the projecting portion at a distance of 15 µm or less without coming into contact with the projecting portion, that is, a lower limit of the distance a.

Considering silver particles as conductive particles contained in conductive ink, silver particles with a maximum particle diameter of approximately 2 to 3 µm are currently used as practical silver particles. If a dimension of a gap, which is to be filled with conductive ink containing such silver particles, is at most the size of two silver particles or less, sufficient electrical connection cannot be secured in that part and two silver particles, which are incidentally aligned in the width direction, may be caught and remain in the gap. Accordingly, the lower limit of the distance a is preferably set to be substantially the size of two silver particles, that is, be approximately twice of the particle diameter of the silver particle. Currently, the lower limit of the distance a is preferably set to 3×2=6 µm.

FIGS. 3A, 3B, and 3C omit the illustration of endpoints of the side wall 31a on both ends in the extending direction of the recessed portion 31. The same is applied to the side wall 31b and the side wall 31b is a plane which is parallel to the side wall 31a, in this example.

However, the projecting portion in the present invention, generally, may be formed in a location where a surface shape of a side wall in the vicinity changes as, for example, extending direction of the recessed portion is bent, the wiring is terminated there, or a protrusion is provided on a side wall to form a notch on an edge of the wiring. In other words, the projecting portion may be formed on a position in the vicinity of which there are three or more side walls, in the present invention. Also, the projecting portion may be in the inside of a recessed portion which is surrounded by a plurality of side walls each forming planes or curved surfaces in a way that the recessed portion has a shape whose extending direction cannot be defined, such as one, for example, for forming a land electrode.

In the present invention, in general, when there is at least one side wall which forms a plane orthogonal to the plate surface and which draws a line segment limited by two ends when viewed from vertically above the plate surface and there is at least one projecting portion that the side wall opposes at a distance of 15 µm or less without coming into contact with the side wall, then a side surface of the projecting portion facing the side wall is required to have a semicircular arc-shaped contour which protrudes toward the side wall.

Further, in the present invention, there is no restriction on a side wall which is separate from a projecting portion at a distance greater than 15 µm. Specifically, the side wall does not have to be a plane which is extended along the extending direction of the recessed portion 31 such as the side wall 31b of FIGS. 3A, 3B, and 3C, for example, and the side wall may have any kind of shape.

The present invention specifies, in association with one projecting portion, a relationship between the projecting portion and at least one side wall and a shape that the projecting portion should have.

Here, the present invention is properly described and understood by mentioning one or both of two side walls, which are planes and are parallel to each other, of a recessed portion that extends in one direction, as a representative example of the at least one side wall. Further, a multiple number of pieces of projecting portions are typically arrayed along the extending direction.

Therefore, a relationship between a projecting portion and at least one side wall and a shape that the projecting portion should have, which are specified by the present invention, will be described also below by mentioning, as representative examples, embodiments including the recessed portion 31, which extends in one direction and includes two side walls 31a and 31b that are planes and are parallel to each other, and a multiple number of projecting portions 32, which are arrayed along the extending direction of the recessed portion 31.

Second Embodiment

Figure 4C:
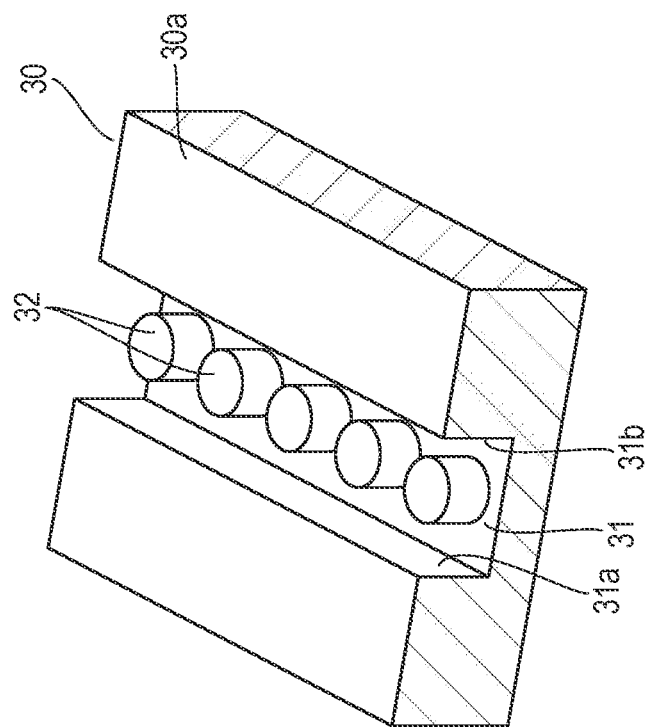
FIG. 4C is a perspective view illustrating the configuration of the main portion of the gravure plate for wiring printing according to the second embodiment of the present invention.
Figure 4A:
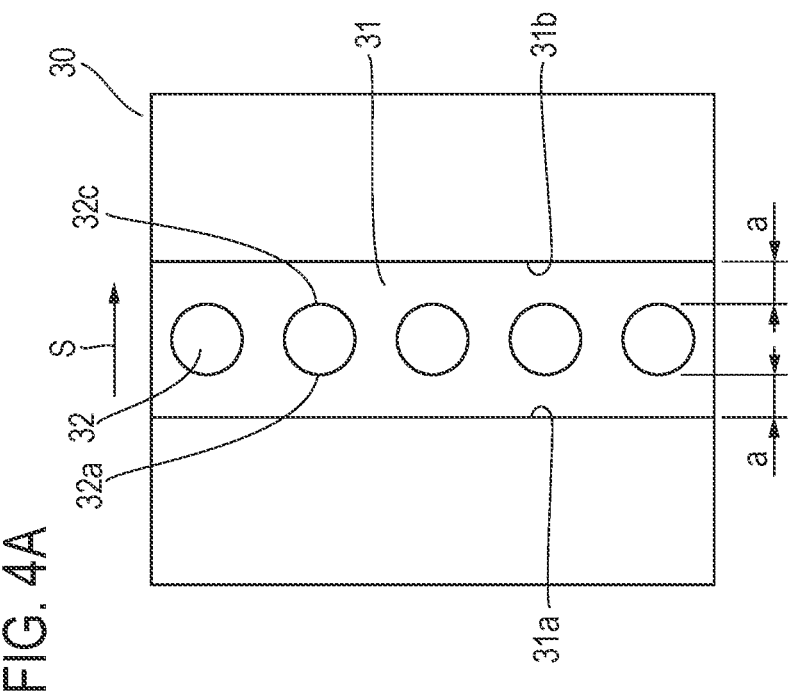
FIG. 4A is a plan view illustrating a configuration of a main portion of a gravure plate for wiring printing according to a second embodiment of the present invention.
Figure 4B:
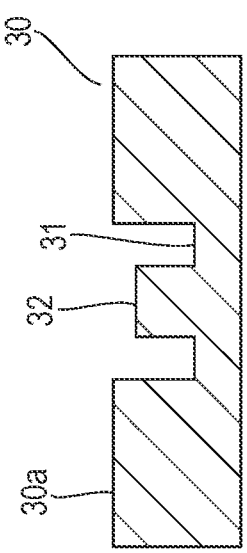
FIG. 4B is a sectional view illustrating the configuration of the main portion of the gravure plate for wiring printing according to the second embodiment of the present invention.

FIGS. 4A, 4B, and 4C illustrate a configuration of a main portion of a gravure plate according to a second embodiment of the present invention. In this example, the width of the recessed portion 31 is narrower than that in the first embodiment and the distance between the side wall 31b and the projecting portion 32 is the distance a as well as the distance between the side wall 31a and the projecting portion 32, that is, the distance between the side wall 31b and the projecting portion 32 is 15 µm or less.

In this example, in terms of the contour of the projecting portion 32 in cross section parallel to the plate surface 30a, the projecting portion 32 has also a semicircular arc-shaped contour 32c, which protrudes toward the side wall 31b that opposes the projecting portion 32 at the distance a, on the side facing the side wall 31b similarly to the side facing the side wall 31a so as to suppress an occurrence of a state in which a foreign body is caught and remains. That is, the projecting portion 32 has a cylindrical shape whose cross section has the semicircular arc-shaped contours 32a and 32c which do not overlap with each other, in this example.

Third Embodiment

Figure 5C:
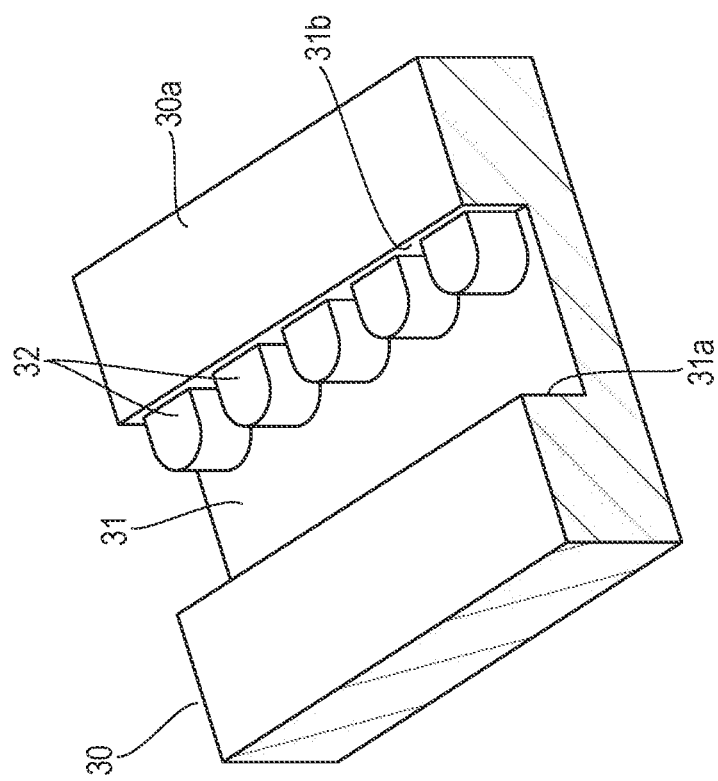
FIG. 5C is a perspective view illustrating the configuration of the main portion of the gravure plate for wiring printing according to the third embodiment of the present invention.
Figure 5A:
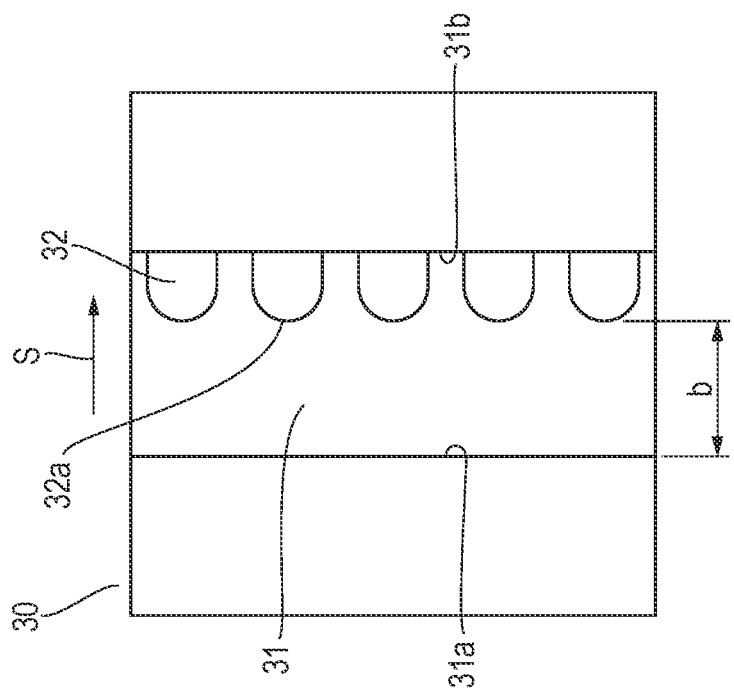
FIG. 5A is a plan view illustrating a configuration of a main portion of a gravure plate for wiring printing according to a third embodiment of the present invention.
Figure 5B:
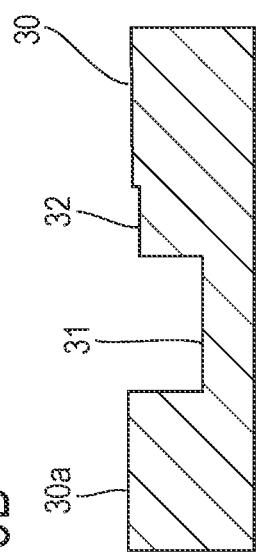
FIG. 5B is a sectional view illustrating the configuration of the main portion of the gravure plate for wiring printing according to the third embodiment of the present invention.

FIGS. 5A, 5B, and 5C illustrate a configuration of a main portion of a gravure plate according to a third embodiment of the present invention. In this example, the projecting portions 32 for reducing the volume of the recessed portion 31 are formed on the bottom surface of the recessed portion 31 in a state in which side surfaces of the projecting portions 32 are in surface contact with one side wall 31b of the recessed portion 31. The distance between the side wall 31a and the projecting portion 32 is the distance b, that is, the distance is greater than 15 µm. The squeegeeing direction of the doctor blade shown by the arrow S is orthogonal to the extending direction of the recessed portion 31.

In this example, the projecting portion 32 and the side wall 31b are in surface contact with each other and thus, there is no gap therebetween, being able to suppress the occurrence of the state in which a foreign body is caught and remains between the projecting portion 32 and the side wall 31b. Further, the distance between the projecting portions 32 and the side wall 31a is greater than 15 µm, being able to suppress the occurrence of the state in which a foreign body is caught and remains between the projecting portions 32 and the side wall 31a. Here, the projecting portion 32 has a shape obtained by combining a semicircular column with a quadrangular prism as is the case with the projecting portion 32 in the first embodiment, and the projecting portion 32 has the semicircular arc-shaped contour 32a as a first semicircular arc shape which protrudes upstream, or protrudes in one direction, on the upstream side in the squeegeeing direction, or on a first side facing in the one direction.

The third embodiment also includes the recessed portion 31, which extends in one direction and includes two side walls 31a and 31b that are planes and are parallel to each other, and a multiple number of pieces of projecting portions 32, which are arrayed along the extending direction of the recessed portion 31, as described above.

But the present invention is not limited thereto. In the present invention, in general, when there is at least one side wall which draws a segment of a line including a straight or curved line whose both ends are limited when viewed from vertically above a plate surface and there is at least one projecting portion a side surface of which, including a plane or a curved surface, is in surface contact with the side wall forming an expansive contact surface, then the projecting portion is required to have a semicircular arc-shaped contour, which protrudes in one direction, outside the side surface thereof.

Fourth Embodiment

Figure 6C:
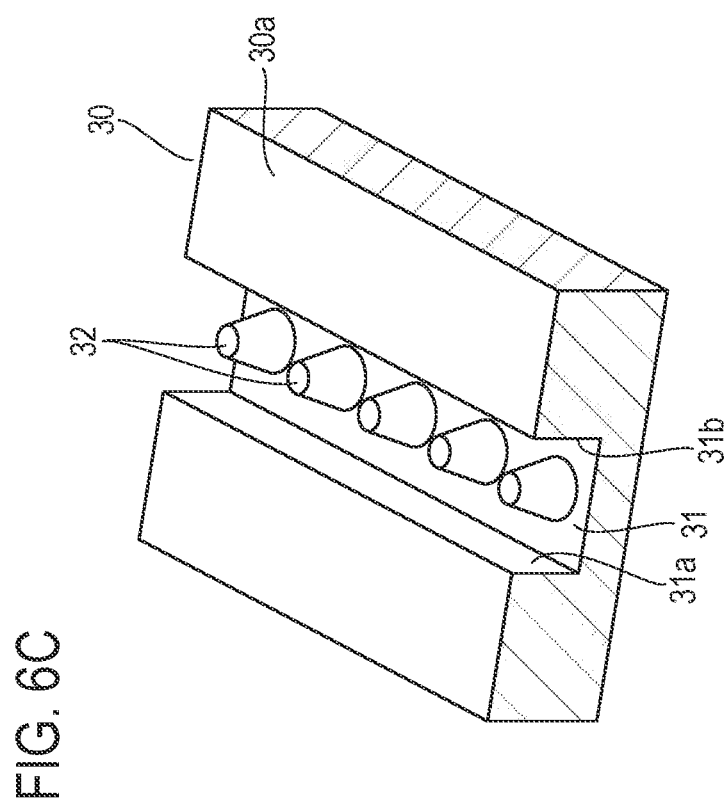
FIG. 6C is a perspective view illustrating the configuration of the main portion of the gravure plate for wiring printing according to the fourth embodiment of the present invention.
Figure 6A:
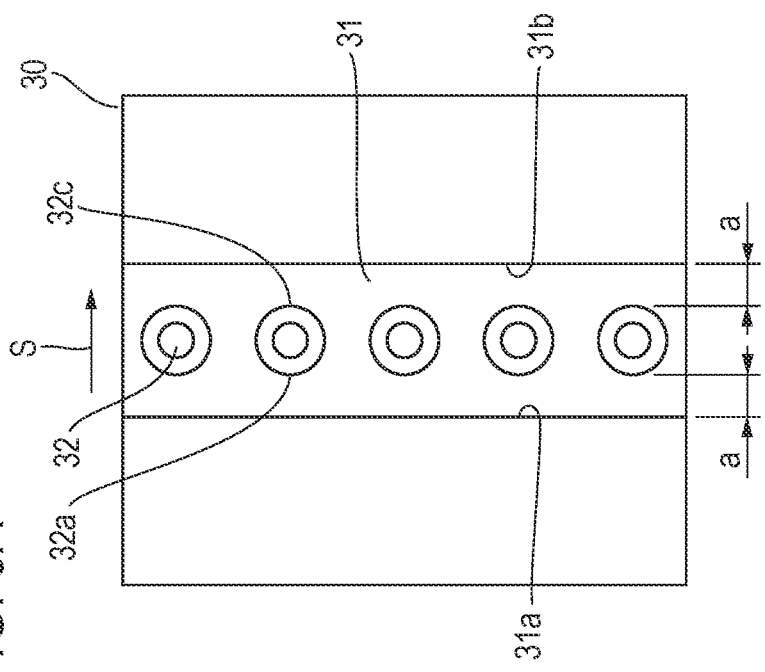
FIG. 6A is a plan view illustrating a configuration of a main portion of a gravure plate for wiring printing according to a fourth embodiment of the present invention.
Figure 6B:
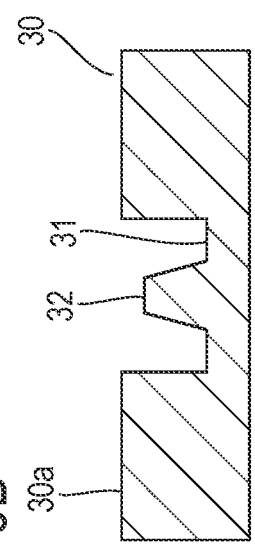
FIG. 6B is a sectional view illustrating the configuration of the main portion of the gravure plate for wiring printing according to the fourth embodiment of the present invention.

FIGS. 6A, 6B, and 6C illustrate a configuration of a main portion of a gravure plate according to a fourth embodiment of the present invention. The fourth embodiment is a modification of the second embodiment and the shape of the projecting portion 32 is different from that of the second embodiment.

In this example, the projecting portion 32 has a truncated cone shape. In such a shape of the projecting portion 32, side surfaces of the projecting portion 32 which each face the side walls 31a and 31b at the distance a, respectively, are slanted to further separate from each of the side walls 31a and 31b as the distance from the bottom surface of the recessed portion 31 in the direction orthogonal to the plate surface 30a increases. By this configuration, a foreign body is hardly caught by the projecting portion 32. Further, since the gaps between the projecting portion 32 and both of the side walls 31a and 31b expand upward, the foreign body comes out easily even if it is caught in the gap. Thus, remaining of a foreign body in the recessed portion 31 can be more effectively suppressed than the configuration of the second embodiment.

Fifth Embodiment

Figure 7A:
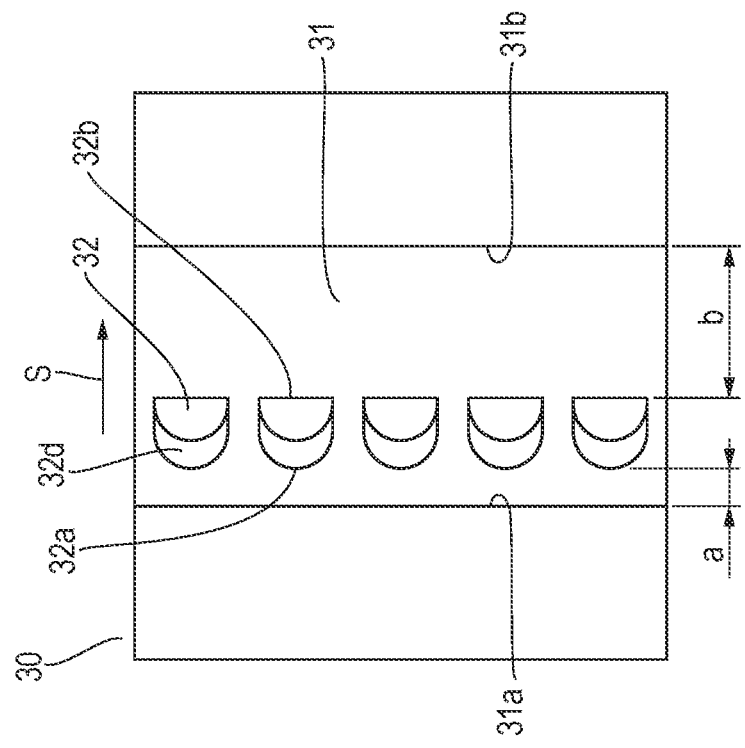
FIG. 7A is a plan view illustrating a configuration of a main portion of a gravure plate for wiring printing according to a fifth embodiment of the present invention.
Figure 7B:
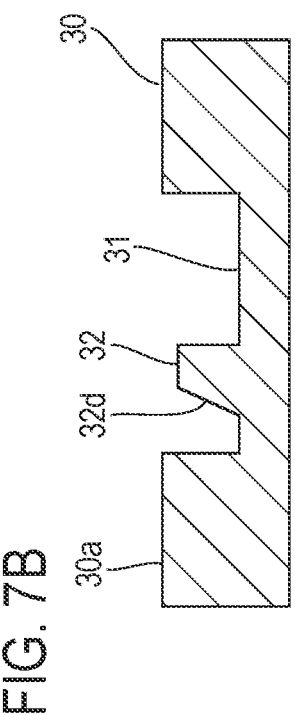
FIG. 7B is a sectional view illustrating the configuration of the main portion of the gravure plate for wiring printing according to the fifth embodiment of the present invention.
Figure 7C:
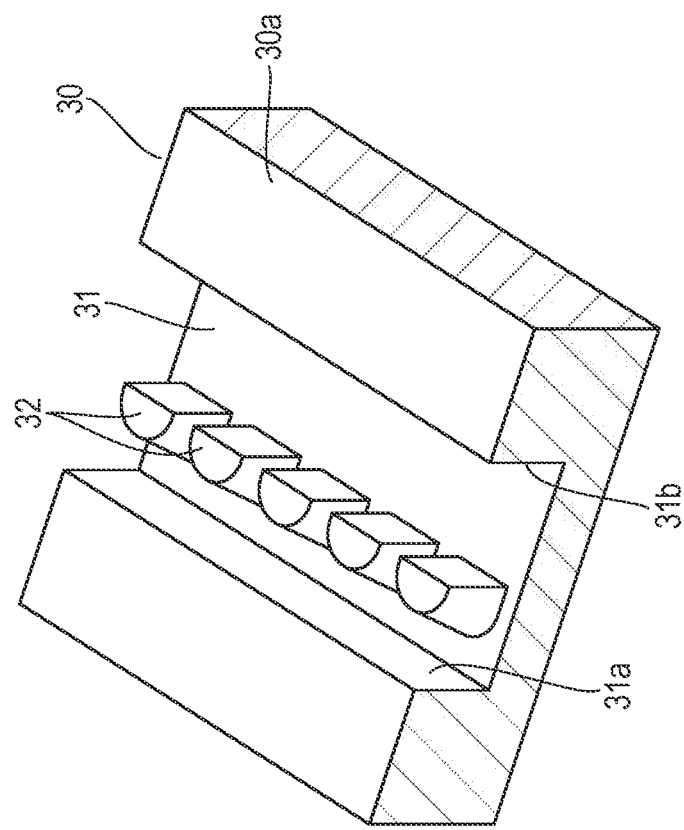
FIG. 7C is a perspective view illustrating the configuration of the main portion of the gravure plate for wiring printing according to the fifth embodiment of the present invention.

FIGS. 7A, 7B, and 7C illustrate a configuration of a main portion of a gravure plate according to a fifth embodiment of the present invention. The fifth embodiment is a modification of the first embodiment and the shape of the projecting portion 32 is different from that of the first embodiment.

In this example, a side surface of the projecting portion 32 which faces the side wall 31a at the distance a is slanted to further separate from the side wall 31a as the distance from the bottom surface of the recessed portion 31 in the direction orthogonal to the plate surface 30a increases, as is the case with the fourth embodiment. A side surface 32d of the projecting portion 32 facing the side wall 31a is a slanted semi-cylindrical surface in this example.

In all of the above-described embodiments, the extending direction of the recessed portion 31 is orthogonal to the squeegeeing direction of the doctor blade shown with the arrow S. But the present invention is not limited to this. The extending direction of the recessed portion 31 may be parallel or slanted with respect to the squeegeeing direction of the doctor blade. Based on such a relationship between the extending direction of the recessed portion 31 and the squeegeeing direction of the doctor blade, various configurations the recessed portion 31 and the projecting portion 32 can take in the present invention will be illustrated in FIGS. 8A, 8B, 8C, 8D, 8E, and 8F, FIGS. 9A, 9B, 9C, and 9D, FIGS. 10A, 10B, 10C, and 10D, FIGS. 11A, 11B, 11C, and 11D, FIGS. 12A, 12B, and 12C, and FIGS. 13A and 13B.

FIGS. 8A, 8B, 8C, 8D, 8E, and 8F and FIGS. 9A, 9B, 9C, and 9D respectively illustrate configurations in which the squeegeeing direction is orthogonal to the extending direction of the recessed portion 31 and configurations in which the squeegeeing direction is parallel to the extending direction of the recessed portion 31 when the projecting portion 32 is not in contact with the side walls 31a and 31b of the recessed portion 31. FIGS. 10A, 10B, 10C, and 10D and FIGS. 11A, 11B, 11C, and 11D respectively illustrate configurations in which the squeegeeing direction is orthogonal to the extending direction of the recessed portion 31 and configurations in which the squeegeeing direction is parallel to the extending direction of the recessed portion 31 when the projecting portion 32 is in surface contact with one side wall 31b of the recessed portion 31. Further, FIGS. 12A, 12B, and 12C and FIGS. 13A and 13B respectively illustrate configurations in which the projecting portion 32 is not in contact with the side walls 31a and 31b of the recessed portion 31 and configurations in which the projecting portion 32 is in surface contact with one side wall 31b when the squeegeeing direction is slanted by 45° with respect to the extending direction of the recessed portion 31. The configuration illustrated in FIGS. 8A and 8B corresponds to the first embodiment described above and the configuration illustrated in FIGS. 8C and 8D corresponds to the second embodiment. Further, the aspect illustrated in FIGS. 10A and 10B corresponds to the third embodiment.

In these FIGS. 8A, 8B, 8C, 8D, 8E, and 8F, FIGS. 9A, 9B, 9C, and 9D, FIGS. 10A, 10B, 10C, and 10D, FIGS. 11A, 11B, 11C, and 11D, FIGS. 12A, 12B, and 12C, and FIGS. 13A and 13B, a which denotes the distance is shown on all the spots where the distance between the side wall 31a or 31b and the projecting portion 32 is 15 μm or less. Each distance, provided with no a in the drawing, between the side wall 31a or 31b and the projecting portion 32 is greater than 15 μm, and FIGS. 8A, 8B, 8C, 8D, 8E, and 8F, FIGS. 9A, 9B, 9C, and 9D, FIGS. 10A, 10B, 10C, and 10D, FIGS. 11A, 11B, 11C, and 11D, FIGS. 12A, 12B, and 12C, and FIGS. 13A and 13B omit the entry of b denoting a distance. In terms of a contour of the projecting portion 32 in cross section parallel to the plate surface 30a, FIGS. 8A, 8B, 8C, 8D, 8E, and 8F, FIGS. 9A, 9B, 9C, and 9D, FIGS. 10A, 10B, 10C, and 10D, FIGS. 11A, 11B, 11C, and 11D, FIGS. 12A, 12B, and 12C, and FIGS. 13A and 13B provides a reference character 32e, corresponding to a first semicircular arc shape on a first side, to a semicircular arc-shaped contour which protrudes toward the upstream side of the squeegeeing direction, provides a reference character 32f, corresponding to a second semicircular arc shape on a second side, to a semicircular arc-shaped contour which protrudes toward the side wall 31a or 31b that opposes the projection portion 32 at the distance a, and provides a reference character 32g, corresponding simultaneously to a first semicircular arc shape and a second semicircular arc shape on a first side and a second side that overlap entirely, to a semicircular arc-shaped contour when the semicircular arc-shaped contour faces the upstream side in the squeegeeing direction and also faces the side wall 31a or 31b that the projecting portion 32 faces at the distance a, where the facing directions are completely accorded with each other.

Figure 9A:
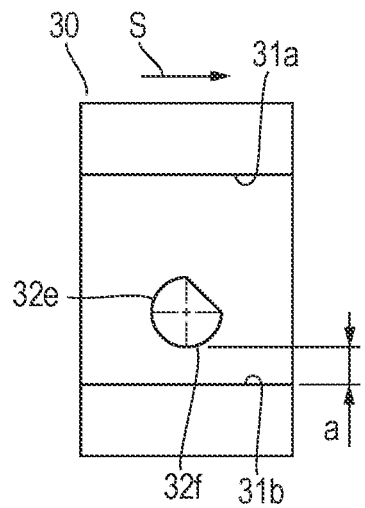
FIG. 9A is a plan view illustrating yet another example of a recessed portion and a projecting portion.
Figure 9B:
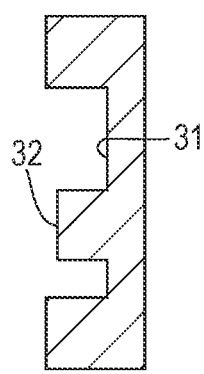
FIG. 9B is a sectional view of the example illustrated in FIG. 9A.
Figure 9C:
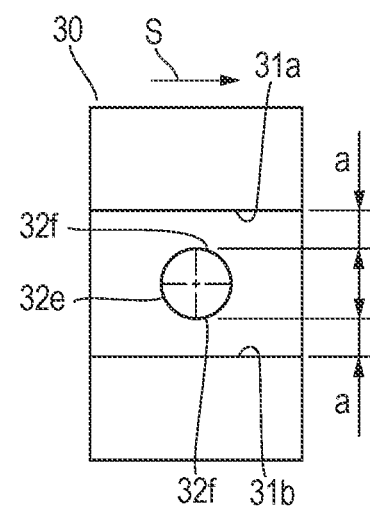
FIG. 9C is a plan view illustrating yet another example of a recessed portion and a projecting portion.
Figure 9D:
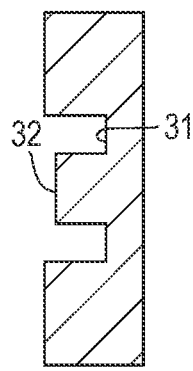
FIG. 9D is a sectional view of the example illustrated in FIG. 9C.
Figure 10A:
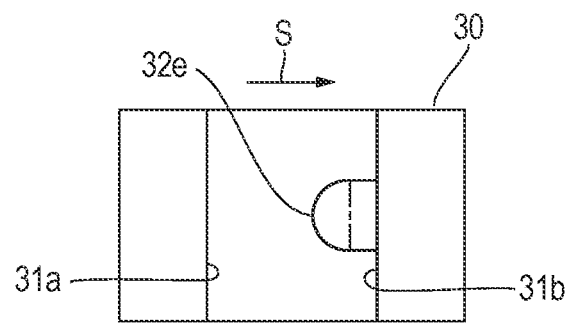
FIG. 10A is a plan view illustrating yet another example of a recessed portion and a projecting portion.
Figure 10B:
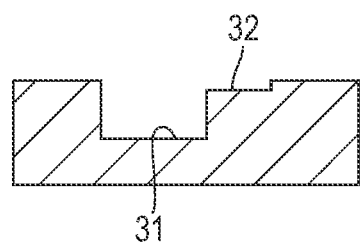
FIG. 10B is a sectional view of the example illustrated in FIG. 10A.
Figure 10C:
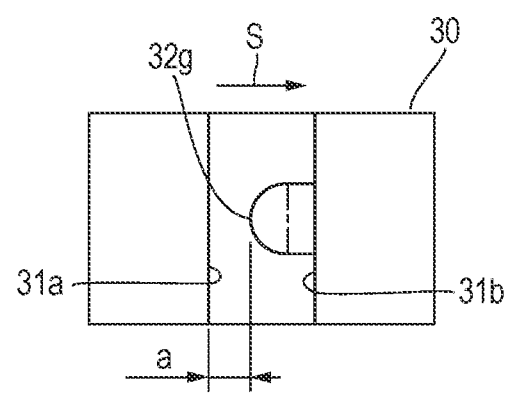
FIG. 10C is a plan view illustrating yet another example of a recessed portion and a projecting portion.
Figure 10D:
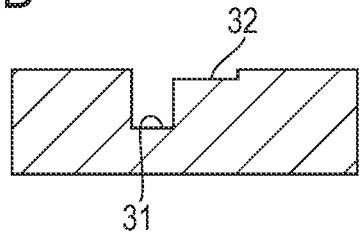
FIG. 10D is a sectional view of the example illustrated in FIG. 10C.
Figure 11A:
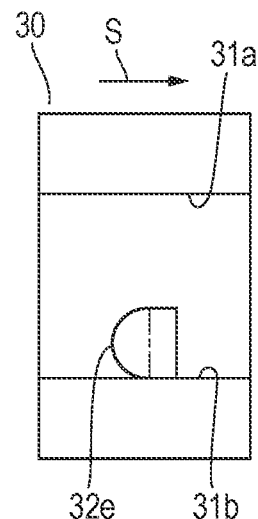
FIG. 11A is a plan view illustrating yet another example of a recessed portion and a projecting portion.
Figure 11B:
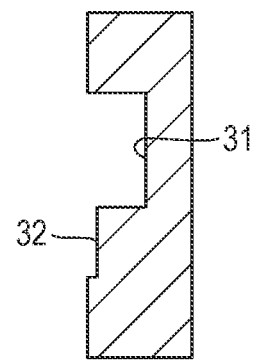
FIG. 11B is a sectional view of the example illustrated in FIG. 11A.
Figure 11C:
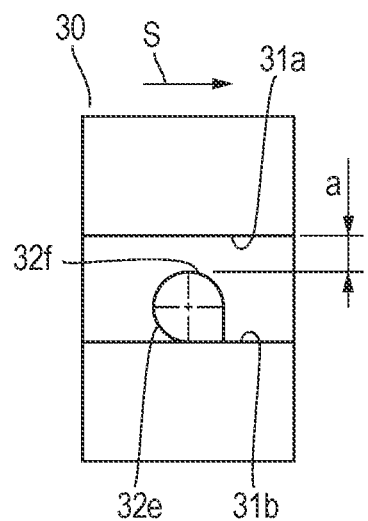
FIG. 11C is a plan view illustrating yet another example of a recessed portion and a projecting portion.
Figure 11D:
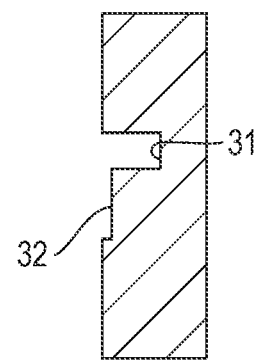
FIG. 11D is a sectional view of the example illustrated in FIG. 11C.
Figure 12A:
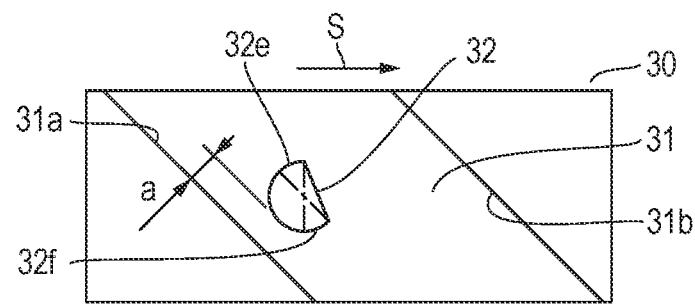
FIG. 12A is a plan view illustrating yet another example of a recessed portion and a projecting portion.
Figure 12B:
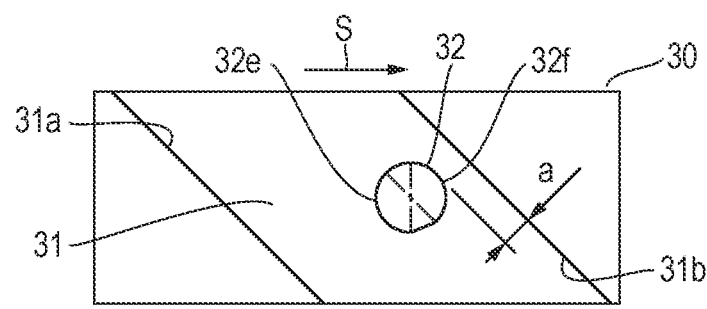
FIG. 12B is a plan view illustrating yet another example of a recessed portion and a projecting portion.
Figure 12C:
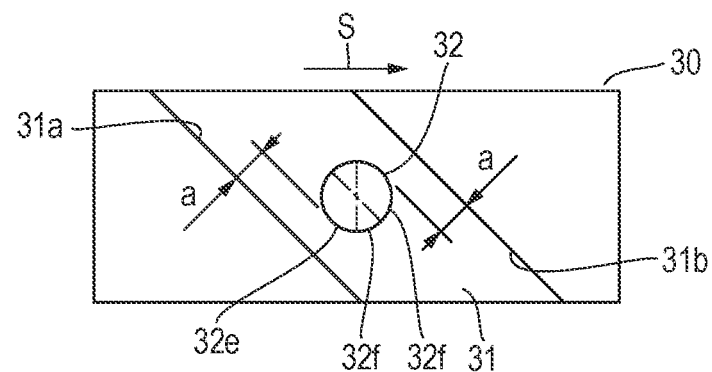
FIG. 12C is a plan view illustrating yet another example of a recessed portion and a projecting portion.
Figure 13A:
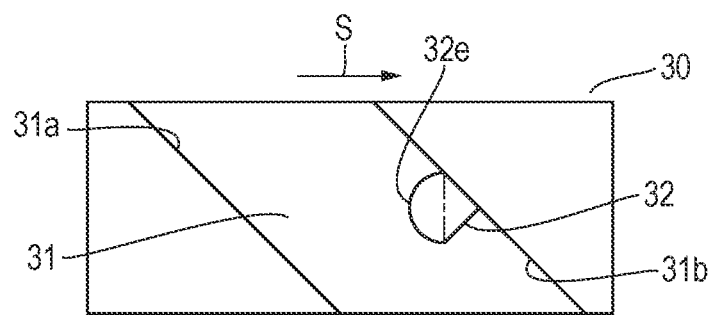
FIG. 13A is a plan view illustrating yet another example of a recessed portion and a projecting portion.
Figure 13B:
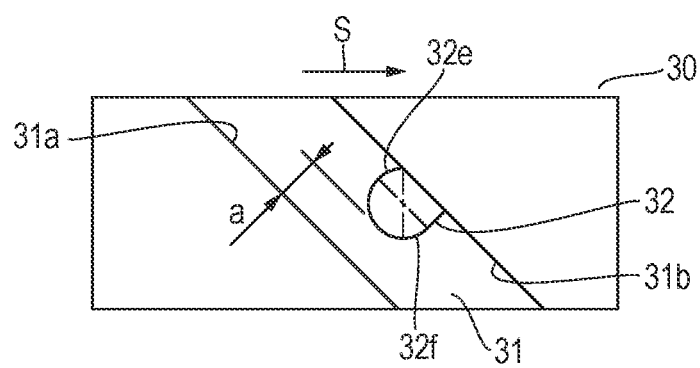
FIG. 13B is a plan view illustrating yet another example of a recessed portion and a projecting portion.

Concerning the contour of the projecting portion 32 in cross section parallel to the plate surface 30a in the configurations illustrated in FIGS. 8A, 8B, 8C, 8D, 8E, and 8F, FIGS. 9A, 9B, 9C, and 9D, FIGS. 10A, 10B, 10C, and 10D, FIGS. 11A, 11B, 11C, and 11D, FIGS. 12A, 12B, and 12C, and FIGS. 13A and 13B, the semicircular arc-shaped contour 32e and the semicircular arc-shaped contour 32f in FIG. 9A and FIG. 11C, or the first side and the second side thereof in other words, overlap with each other by 90° central angle. The semicircular arc-shaped contour 32e and two semicircular arc-shaped contours 32f in FIG. 9C, or the first side and two of the second sides thereof in other words, overlap by 90° central angle, respectively. Further, the semicircular arc-shaped contour 32e and the semicircular arc-shaped contour 32f in FIG. 12A and FIG. 13B, or the first side and the second side thereof in other words, overlap with each other by 135° central angle. The semicircular arc-shaped contour 32e and the semicircular arc-shaped contour 32f in FIG. 12B, or the first side and the second side thereof in other words, overlap with each other by 45° central angle. Furthermore, the semicircular arc-shaped contour 32e and two semicircular arc-shaped contours 32f in FIG. 12C, or the first side and two of the second sides thereof in other words, overlap by 135° central angle and by 45° central angle, respectively.

It is preferable that the side surface of the projecting portion 32 on which the semicircular arc-shaped contours 32f or 32g is positioned is slanted to further separate from the side wall 31a or 31b that the projecting portion 32 faces, as the distance from the bottom surface of the recessed portion 31 increases upward, likely to the fourth and fifth embodiments.

The embodiments of the gravure plate and variations of the relationship between the extending direction of the recessed portion 31 and the squeegeeing direction S of the doctor blade according to the present invention have been described above. The gravure plate includes projecting portions, reducing a volume of the recessed portion, on the bottom surface of the recessed portion defining a wiring pattern. The features of the configurations described above can be summarized as follows.

First, a contour of the projecting portion in cross section parallel to a plate surface has a first semicircular arc shape on a first side thereof, wherein the first side faces in one direction that is parallel to the plate surface and the first semicircular arc shape protrudes in the one direction. In a printing method using the gravure plate according to the present invention, filling of conductive ink is performed by squeegeeing in which a doctor blade is squeegeed in the above-mentioned one direction so that the upstream of the squeegeeing direction, more specifically, is matched with the above-mentioned one direction.

This configuration suppresses chipping of the cutting edge of the doctor blade.

Second, in the configuration in which a projecting portion is formed to be in contact with a side wall of a recessed portion, the contact necessarily is in surface contact as described above, excluding line contact (or point contact in cross section).

This configuration suppresses the occurrence of the state in which a foreign body is caught and remains between the side wall and the projecting portion.

In this configuration, the projecting portion has a semicircular arc-shaped contour outside the contact surface between the side wall and the projecting portion, where the semicircular arc-shaped contour protrudes in the above-mentioned one direction.

Third, when a recessed portion has a side wall which forms a plane orthogonal to a plate surface and opposes a projecting portion without coming into contact with the projecting portion, a contour of the projecting portion in cross section parallel to the plate surface is formed to have, on a second side thereof which faces the sidewall, a second semicircular arc shape which protrudes toward the side wall when the distance between the side wall and the projecting portion is 15 μm or less, while the contour is not especially limited in its shape on the second side when the distance is greater than 15 μm.

This configuration suppresses the occurrence of the state in which a foreign body is caught and remains between the side wall and the projecting portion.

Here, the second semicircular arc shape protruding toward the side wall and the first semicircular arc shape protruding in the above-mentioned one direction may be completely identical. In other words, these two semicircular arc shapes may entirely overlap with each other. Alternatively, the second semicircular arc shape on the second side and the first semicircular arc shape on the first side may be opposite to each other and be completely separated from each other. In other words, these two semicircular arc shapes may have no mutually-overlapping portion. Further alternatively, the second semicircular arc shape and the first semicircular arc shape may be partially overlapped with each other. In other words, these contours may partially overlap with each other.

Fourth, as a preferable configuration, the side surface of a projecting portion facing the side wall at a distance of 15 μm or less, which has a semicircular arc-shaped contour in cross section thereof is formed to be slanted so that the side surface further separates from the side wall as the distance from the bottom surface of the recessed portion increases upward.

By this configuration a foreign body is hardly caught and hardly remains between the side wall and the projecting portion, and even when the foreign body is caught, the foreign body easily comes out.

Fifth, as a preferable configuration from another point of view, if a recessed portion, which is generally surrounded by a multiple number of side walls, has a plurality of side walls that each form planes and each oppose the projecting portion at a distance of 15 µm or less, respectively, then the contour of the projecting portion in cross section parallel to the plate surface is formed to have, on its each side facing each of the plurality of side walls, a semicircular arc shape protruding toward the each of the plurality of side walls.

This furtherly ensures the effect of the present invention as a technical concept in suppressing the occurrence of the state in which a foreign body is caught and remains between the projecting portion and the side wall which opposes the projecting portion with a gap.

Sixth, as a preferable configuration from still another point of view, if a recessed portion, which is generally surrounded by a multiple number of side walls, has a plurality of side walls that are each in contact with the projecting portion, the projecting portion is in surface contact with each of all the plurality of side walls.

This furtherly ensures the effect of the present invention as a technical concept in suppressing the occurrence of the state in which a foreign body is caught and remains between the projecting portion and the side wall which is in contact with the projecting portion.

It should be noted that the present invention does not have any limitation about a projecting portion and a side wall when the side wall is separated at a distance not greater than 15 µm from the projecting portion but does not form a plane orthogonal to the plate surface. However, even when that is the case, a more favorable shape of the projecting portion or the side wall can be employed by applying the technical concept of the present invention. Conceivable examples of such an application include the configuration in which a side wall is formed to have a curved surface whose cross section has a semicircular arc-shaped contour protruding toward a projecting portion even when the side surface of the projecting portion facing the side wall has a flat contour in cross section. This configuration also can suppress the occurrence of the state in which a foreign body is caught and remains between the projecting portion and the side wall.

The foregoing description of the embodiments of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A gravure printing plate for gravure-printing a wiring pattern with conductive ink including silver particles, the gravure printing plate comprising:
    a groove to be filled with the conductive ink by a doctor blade squeegeeing the gravure printing plate in a predetermined squeegeeing direction, the groove having two parallel sidewalls and a bottom extending between the two parallel sidewalls; and
    a bump standing on the bottom of the groove, the bump having a top face located in the groove, wherein
    the bump consists, when viewed in the predetermined squeegeeing direction, of a front portion close to the doctor blade heading for the groove, and a rear portion being a remaining portion thereof,
    the front portion of the bump has a shape of a half cylinder and face neither of the two parallel sidewalls within a range of smaller than six micrometers in front, in the predetermined squeegeeing direction, of the front portion,
    the rear portion of the bump has a shape different from the shape of the front portion of the bump,
    the bump consists, when viewed in a direction in which the two parallel sidewalls face each other, of a first portion apart from one of the two parallel sidewalls by a minimum interval between six micrometers and fifteen micrometers inclusive, and a second portion, being a remaining portion thereof, either abutting the other of the two parallel sidewalls to have a planar boundary therebetween or apart from the other of the two parallel sidewalls by a minimum interval not smaller than fifteen micrometers,
    the first portion of the bump has a shape of a half cylinder, and
    the second portion of the bump has a shape different from the shape of the first portion of the bump.

* * * * *